United States Patent
Maruyama et al.

(10) Patent No.: US 8,146,633 B2
(45) Date of Patent: Apr. 3, 2012

(54) PNEUMATIC TIRE

(75) Inventors: Hirokatsu Maruyama, Kanagawa (JP); Satoru Isobe, Kanagawa (JP); Hironori Kobayashi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 217 days.

(21) Appl. No.: 12/282,790

(22) PCT Filed: Jan. 16, 2008

(86) PCT No.: PCT/JP2008/050417
§ 371 (c)(1),
(2), (4) Date: Sep. 12, 2008

(87) PCT Pub. No.: WO2008/093537
PCT Pub. Date: Jul. 8, 2008

(65) Prior Publication Data
US 2009/0277552 A1    Nov. 12, 2009

(30) Foreign Application Priority Data
Jan. 30, 2007   (JP) ................. 2007-019501

(51) Int. Cl.
*B60C 3/00* (2006.01)
*B60C 3/04* (2006.01)
*B60C 9/18* (2006.01)
*B60C 9/28* (2006.01)

(52) U.S. Cl. ......... 152/450; 152/454; 152/526; 152/538

(58) Field of Classification Search .................. 152/450, 152/454, 526, 538
See application file for complete search history.

(56) References Cited

U.S. PATENT DOCUMENTS

| | | | | |
|---|---|---|---|---|
| 4,481,994 A | * | 11/1984 | Pommier | 152/454 |
| 4,840,213 A | * | 6/1989 | Koseki | 152/454 |
| 4,915,151 A | * | 4/1990 | Sato et al. | 152/454 |
| 6,371,185 B1 | | 4/2002 | Suzuki | |
| 6,640,860 B1 | | 11/2003 | Metge et al. | |

FOREIGN PATENT DOCUMENTS

| JP | 2-204104 | * 8/1990 |
|---|---|---|
| JP | A 11-180109 | 7/1999 |
| JP | A 2001-39111 | 2/2001 |
| JP | A 2001-71715 | 3/2001 |
| JP | A 2007-326392 | 12/2007 |

* cited by examiner

*Primary Examiner* — Justin Fischer
(74) *Attorney, Agent, or Firm* — Greer, Burns & Crain, Ltd.

(57) ABSTRACT

In a pneumatic tire, 48%≦HB/HA≦52%, 98%≦HC/HA≦100%, 108%≦WB/WA≦115%, and 55%≦WC/WA≦75% are satisfied, where, when a line from a position A of rim height FH in tire width direction is X-axis and a line in tire radial direction via center crown CL is Y-axis, WA is distance of a half of tire base width, WB is distance from the Y-axis to a maximum width position P of a carcass layer, WC is distance from the Y-axis to an inflection point Q of the carcass layer, HA is distance from the X-axis to a peak R of the carcass layer on the center crown CL, HB is distance from the X-axis to the maximum width position P, and HC is distance from the X-axis to the inflection point Q.

8 Claims, 9 Drawing Sheets

RELATIONSHIP BETWEEN WC/WB AND ASPECT RATIO S

RELATIONSHIP BETWEEN MAXIMUM BELT
WIDTH Wd, TIRE WIDTH Ws, AND ASPECT RATIO S

FIG.5

| ASPECT RATIO OF 60 | 285/60R22.5 | | | | | | |
|---|---|---|---|---|---|---|---|
| | CONVEN-TIONAL EXAMPLE | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 |
| 48%~52%　HB/HA | 60% | 46% | 63% | 49% | 48% | 50% | 52% |
| 98%~100%　HC/HA | 97% | 96% | 97% | 98% | 98% | 99% | 99% |
| 108%~115%　WB/WA | 111% | 110% | 112% | 110% | 109% | 111% | 113% |
| 55%~75%　WC/WA | 77% | 56% | 85% | 53% | 57% | 66% | 74% |
| 53%~63%　WC/WB | 69% | 48% | 77% | 50% | 56% | 59% | 64% |
| 78%~88%　W | 85% | 80% | 87% | 75% | 78% | 82% | 85% |
| RIM-CUSHION CRACKING | 100 | 130 | 80 | 100 | 100 | 100 | 100 |
| GROOVE CRACKING | 100 | 90 | 160 | 150 | 75 | 60 | 80 |

FIG.6

| ASPECT RATIO OF 55 | 385/55R22.5 | | | | | | |
|---|---|---|---|---|---|---|---|
| | CONVENTIONAL EXAMPLE | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 |
| 48%~52%  HB/HA | 56% | 46% | 59% | 49% | 48% | 50% | 52% |
| 98%~100% HC/HA | 97% | 98% | 99% | 98% | 98% | 99% | 99% |
| 108%~115% WB/WA | 110% | 106% | 117% | 112% | 108% | 110% | 113% |
| 55%~75%  WC/WA | 77% | 53% | 83% | 53% | 58% | 68% | 73% |
| 57%~67%  WC/WB | 70% | 46% | 74% | 55% | 58% | 62% | 64% |
| 75%~85%  W | 86% | 76% | 87% | 72% | 82% | 80% | 78% |
| RIM-CUSHION CRACKING | 100 | 130 | 80 | 100 | 100 | 100 | 100 |
| GROOVE CRACKING | 100 | 100 | 150 | 78 | 78 | 70 | 84 |

FIG.9

|  | LARGE | SMALL |
|---|---|---|
| USH/HA | GROOVE CRACKING RESISTANCE IMPROVES, BELT-LAYER DURABILITY DEGRADES | GROOVE CRACKING RESISTANCE DEGRADES, BELT-LAYER DURABILITY IMPROVES |
| WB/HA | GROOVE CRACKING RESISTANCE DEGRADES, BELT-LAYER DURABILITY IMPROVES | GROOVE CRACKING RESISTANCE IMPROVES, BELT-LAYER DURABILITY DEGRADES |
| WC/WB | GROOVE CRACKING RESISTANCE DEGRADES, BELT-LAYER DURABILITY IMPROVES | GROOVE CRACKING RESISTANCE IMPROVES, BELT-LAYER DURABILITY DEGRADES |

FIG.10

| | CONVENTIONAL EXAMPLE | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|---|---|---|
| USH/HA | 0.449 | 0.480 | 0.480 | 0.480 | 0.480 | 0.520 | 0.520 | 0.520 | 0.520 | 0.500 |
| WB/HA | 1.071 | 1.055 | 1.055 | 1.135 | 1.135 | 1.055 | 1.055 | 1.135 | 1.135 | 1.095 |
| WC/WB | 0.694 | 0.562 | 0.622 | 0.562 | 0.622 | 0.562 | 0.622 | 0.562 | 0.622 | 0.592 |
| GROOVE CRACKING RESISTANCE | 100 | 159 | 134 | 134 | 130 | 180 | 159 | 159 | 134 | 147 |
| BELT-LAYER DURABILITY | 100 | 97 | 106 | 106 | 113 | 86 | 97 | 97 | 106 | 100 |

FIG.11

| | EXAMPLE 14 | EXAMPLE 15 | EXAMPLE 16 | EXAMPLE 17 | EXAMPLE 18 |
|---|---|---|---|---|---|
| WA/M WIDTH | 0.42 | 0.44 | 0.45 | 0.46 | 0.48 |
| AIR INFLATION PERFORMANCE | 90 | 95 | 100 | 110 | 110 |
| BEAD-PORTION DURABILITY | 115 | 110 | 100 | 95 | 90 |

PNEUMATIC TIRE

This application is a U.S. National Phase under 35 U.S.C. §371, of International Application No. PCT/JP2008/050417, filed Jan. 16, 2008.

TECHNICAL FIELD

The present invention relates to a pneumatic tire, and more particularly, to a pneumatic tire with a capability of preventing a groove cracking.

BACKGROUND ART

In a heavy-duty pneumatic tire with a low tire profile, a groove cracking (cracking in a bottom of a groove) occurs in a circumferential main groove on its outer side in its tire width direction.

As for a conventional pneumatic tire concerning the above problem, a technology disclosed in Patent document 1 is known. The conventional pneumatic tire (heavy-duty pneumatic tire) includes a carcass with end portions that are bent around a pair of bead cores, a belt that is provided on an outer circumferential side of a crown portion of the carcass, a tread that is provided to the outer circumferential side of the belt, and a plurality of circumferential grooves formed on a tread contact surface and extend in a circumferential direction of the tire. When the conventional pneumatic tire is mounted on a standard rim in a state in which the conventional pneumatic tire is filled with an air pressure of 5% of the maximum air pressure, a curvature radius of a carcass line is small in at least inner circumferential side portion in a tire radial direction of the outermost circumferential groove in a tread width direction compared to those in other portions. However, it is difficult to manufacture a pneumatic tire with a local variation of a curvature radius of a carcass line.

Patent document 1: Japanese Patent Application Laid-open No. H11-180109

DISCLOSURE OF INVENTION

Problem to be Solved by the Invention

It is an object of the present invention to provide a pneumatic tire with a capability of preventing a groove cracking.

Means for Solving Problem

To achieve the object, a pneumatic tire according to the present invention is a pneumatic tire having a tire profile equal to or less than 65 and including a pair of bead cores; a carcass layer that bridges between the bead cores in a toroidal shape; and a belt layer that is arranged on outer side of the carcass layer in tire radial direction. In a cross section of the pneumatic tire in tire meridian direction when the pneumatic tire is held without an external pressure to have tire base width equal to or more than 100[%] and equal to or less than 120[%] of a width of an applied rim, relationships $48[\%] \leq HB/HA \leq 52[\%]$, $98[\%] \leq HC/HA \leq 100[\%]$, $108[\%] \leq WB/WA \leq 115[\%]$, and $55[\%] \leq WC/WA \leq 75[\%]$ are satisfied, where, when a straight line that is drawn from a position A of rim height FH in tire width direction is X-axis and a straight line that is drawn in the tire radial direction via center crown CL is Y-axis, WA is distance of a half of the tire base width, WB is distance from the Y-axis to a maximum width position P of the carcass layer, WC is distance from the Y-axis to an inflection point Q of the carcass layer, HA is distance from the X-axis to a peak R of the carcass layer on the center crown CL, HB is distance from the X-axis to the maximum width position P of the carcass layer, and HC is distance from the X-axis to the inflection point Q of the carcass layer.

According to the pneumatic tire, because the shape of the carcass layer (carcass line) is optimized, the change of the shape of the main groove (particularly, the main groove positioned on the outer side in the width direction) is reduced between a state of the tire as it is and a state in which the tire is inflated. This reduces a strain occurring in the groove bottom of the main groove, thereby advantageously preventing a groove cracking.

Furthermore, a pneumatic tire according to the present invention is a pneumatic tire having a tire profile equal to or less than 65 and including a pair of bead cores; a carcass layer that bridges between the bead cores in a toroidal shape; and a belt layer that is arranged on outer side of the carcass layer in tire radial direction. In a cross section of the pneumatic tire in tire meridian direction when the pneumatic tire is held in a curable mold, relationships $48[\%] \leq HB/HA \leq 52[\%]$, $98[\%] \leq HC/HA \leq 100[\%]$, $108[\%] \leq WB/WA \leq 115[\%]$, and $55[\%] \leq WC/WA \leq 75[\%]$ are satisfied, where, when a straight line that is drawn from a position A of rim height FH in tire width direction is X-axis and a straight line that is drawn in the tire radial direction via center crown CL is Y-axis, WA is distance of a half of tire base width, WB is distance from the Y-axis to a maximum width position P of the carcass layer, WC is distance from the Y-axis to an inflection point Q of the carcass layer, HA is distance from the X-axis to a peak R of the carcass layer on the center crown CL, HB is distance from the X-axis to the maximum width position P of the carcass layer, and HC is distance from the X-axis to the inflection point Q of the carcass layer.

A shape of the tire in the curing mold (the shape of the tire just before being taken out of the curing mold) is approximately same as that of the tire before being mounted on the rim. Therefore, the tire shape can be defined based on not only the shape of the tire in the curing mold but also the shape of the tire as it is.

Moreover, in the pneumatic tire according to the present invention, in a state in which the pneumatic tire is mounted on the applied rim and air pressure of 10% of regular internal pressure is applied to the tire, the width WA, the distance WB, the distance WC, the distance HA, the distance HB, and the distance HC satisfy $48[\%] \leq HB/HA \leq 52[\%]$, $98[\%] \leq HC/HA \leq 100[\%]$, $108[\%] \leq WB/WA \leq 115[\%]$, and $55[\%] \leq WC/WA \leq 75[\%]$.

In the pneumatic tire, because a shape of the carcass layer is further optimized, variations in the shape of the main groove during infatuation are reduced. This reduces a strain that occurs in the groove bottom of the main groove, thereby advantageously preventing a groove cracking more effectively.

Furthermore, in the pneumatic tire according to the present invention, WC/WA and a tire profile S of the pneumatic tire satisfy $-0.007 \times S + 0.95 \leq WC/WB \leq -0.007 \times S + 1.05$.

In the pneumatic tire according to the present invention, because the relationship between WC/WB and the profile S of the tire is optimized, the groove cracking resistance and the durability of the tire advantageously improve (are maintained).

Moreover, in the pneumatic tire according to the present invention, in a state in which the pneumatic tire is mounted on the applied rim and regular internal pressure is applied to the tire, maximum belt width Wd of the belt layer, total width Ws of the pneumatic tire, and a tire profile S of the pneumatic tire satisfy $-0.5 \times S + 108 \leq Wd/Ws \leq -0.5 \times S + 118$.

In the pneumatic tire according to the present invention, because the relationship between the maximum belt width Wd, the tire total width Ws, and the profile S is optimized, the groove cracking resistance of the tire advantageously improves (is maintained).

Furthermore, a pneumatic tire according to the present invention is a pneumatic tire having a tire profile equal to or less than 65 and including a pair of bead cores; a carcass layer that bridges between the bead cores in a toroidal shape; and a belt layer that is arranged on outer side of the carcass layer in tire radial direction. In a cross section of the pneumatic tire in tire meridian direction when the pneumatic tire is held in a curable mold, relationships $0.48 \leq USH/HA \leq 0.52$, $5.52S^2 \times 10^{-5} - 2.407S \times 10^{-2} + 2.29 \leq WB/HA \leq 5.52S^2 \times 10^{-5} - 2.407S \times 10^{-2} + 2.39$, and $-1.1312S^2 \times 10^{-4} + 5.822S \times 10^{-3} + 0.62 \leq WC/WB \leq -1.1312S^2 \times 10^{-4} + 5.822S \times 10^{-3} + 0.68$ Are satisfied, where, when a straight line that is drawn from a position A of rim height FH in tire width direction is X-axis and a straight line that is drawn in the tire radial direction via center crown CL is Y-axis, S is nominal profile of the pneumatic tire, USH is distance from a maximum width position P of the carcass layer to an inflection point Q of the carcass layer in the Y-axis direction, HA is distance from the X-axis to a peak R of the carcass layer on the center crown CL, WB is distance from the Y-axis to the maximum width position P of the carcass layer, and WC is distance from the Y-axis to the inflection point Q of the carcass layer.

In the pneumatic tire according to the present invention, because the shape of the carcass layer (carcass line) is optimized, the change of the shape of the main groove (particularly, the main groove positioned on the outer side in the width direction) is reduced between a state of the tire as it is and a state in which the tire is inflated. This reduces a strain occurring in the groove bottom of the main groove, thereby advantageously preventing a groove cracking.

Moreover, in the pneumatic tire according to the present invention, width WA of a half of tire base width and nominal tire cross-sectional width M satisfy $0.44 \leq WA/M \leq 0.46$.

The pneumatic tire according to the present invention is advantageous in that air inflation performance of the tire, durability of a bead portion, and manufacturing failure resistance advantageously improve because the ratio WA/M of the tire base width (half width WA) to the nominal tire cross sectional width M is optimized Furthermore, in the pneumatic tire according to the present invention, curvature radius RA of the carcass layer in a position on outer side of the belt layer in the tire width direction and the distance USH from the maximum width position P of the carcass layer to the inflection point Q of the carcass layer in the Y-axis direction satisfy $0.95 \leq RA/USH \leq 1.05$.

In the pneumatic tire according to the present invention, because the curvature radius RA of the carcass line from the shoulder portion to the sidewall portion is optimized, a strain that occurs in the groove bottoms of the main grooves is effectively reduced, thereby advantageously preventing a groove cracking from occurring.

Moreover, in the pneumatic tire according to the present invention, in a state in which the pneumatic tire is mounted on a rim and air pressure of 5[%] of regular internal pressure is applied to the tire, the nominal profile S of the pneumatic tire, the distance USH, the distance HA, the distance WB, and the distance WC satisfy $4.157S^2 \times 10^{-5} - 6.738S \times 10^{-3} + 0.56 \leq USH/HA \leq 4.157S^2 \times 10^{-5} - 6.738S \times 10^{-3} + 0.63$, and $1.7874S^2 \times 10^{-4} - 2.7522S \times 10^{-2} + 1.60 \leq WC/WB \leq 1.7874S^2 \times 10^{-4} - 2.7522S \times 10^{-2} + 1.66$.

In the pneumatic tire, because a shape of the carcass layer is further optimized, variations in the shape of the main groove during infatuation are reduced. This reduces a strain that occurs in the groove bottom of the main groove, thereby advantageously preventing a groove cracking more effectively.

Furthermore, in the pneumatic tire according to the present invention, the nominal profile S of the pneumatic tire is within a range of $S \leq 70$.

In a heavy-duty pneumatic radial tire, particularly, occurrence of a groove cracking is remarkable. Therefore, by taking those tires as a target, more remarkable effects concerning groove cracking resistance can be advantageously obtained.

Effect of the Invention

According to the pneumatic tire of the present invention, because the shape of the carcass layer (carcass line) is optimized, the change of the shape of the main groove (particularly, the main groove positioned on the outer side in the width direction) is reduced between a state of the tire as it is and a state in which the tire is inflated. This reduces a strain occurring in the groove bottom of the main groove, thereby advantageously preventing a groove cracking.

BRIEF DESCRIPTION OF DRAWINGS

FIG. 5 is a table of results of performance tests on the pneumatic tire according to the first embodiment of the present invention.

FIG. 6 is a table of results of performance tests on the pneumatic tire according to the first embodiment the present invention.

FIG. 9 is a table for explaining characteristics of the pneumatic tire according to the second embodiment of the present invention.

FIG. 10 is a table of results of performance tests on the pneumatic tire according to the second embodiment of the present invention.

FIG. 11 is a table of results of performance tests on the pneumatic tire according to the second embodiment of the present invention.

Figure 1:
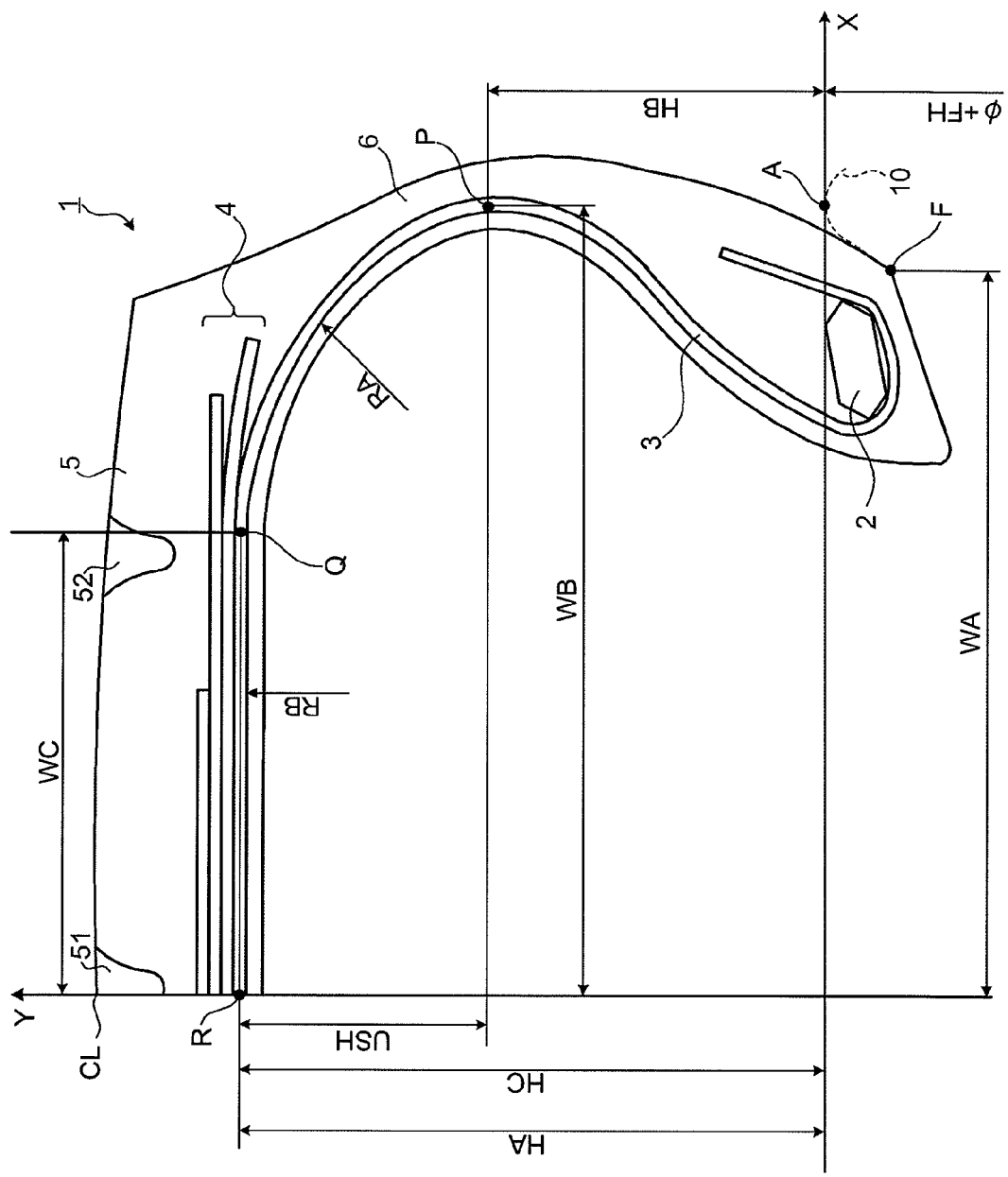
FIG. 1 is a cross section of a pneumatic tire in a tire meridian direction according to an embodiment of the present invention.

EXPLANATIONS OF LETTERS OR NUMERALS 1 pneumatic tire
2 bead core
3 carcass layer
4 belt layer
5 tread rubber
6 sidewall rubber
10 applied rim

BEST MODE(S) FOR CARRYING OUT THE INVENTION

Exemplary embodiments of the present invention are explained in detail below with reference to the accompanying drawings. The present invention is not limited to the embodiments. Constituent elements of the embodiments include those that can be easily replaced by those skilled in the art and those substantially the same. A plurality of modified examples of the embodiments can be arbitrarily combined within a scope apparent to those skilled in the art.

First Embodiment

Figure 2:
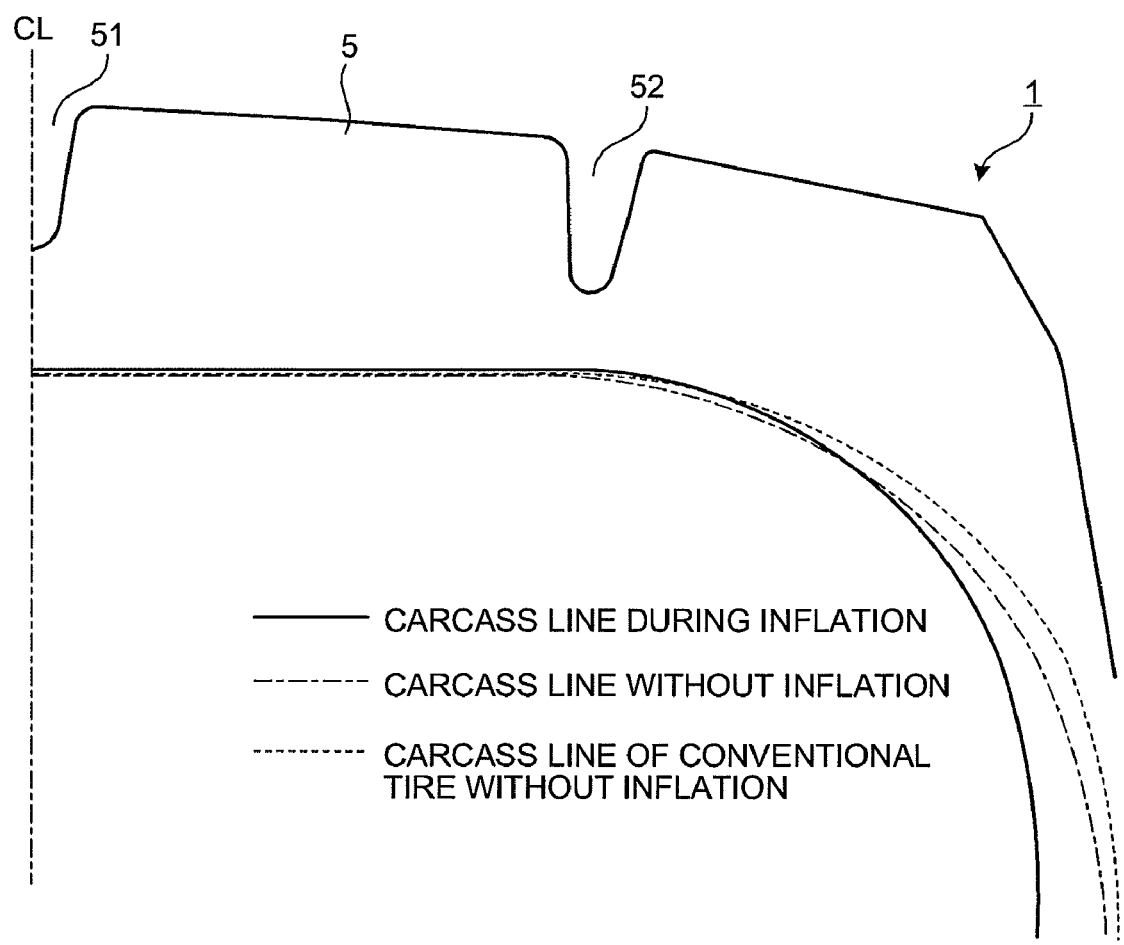
FIG. 2 is a schematic diagram for explaining a movement of the pneumatic tire shown in FIG. 1.
Figure 3:
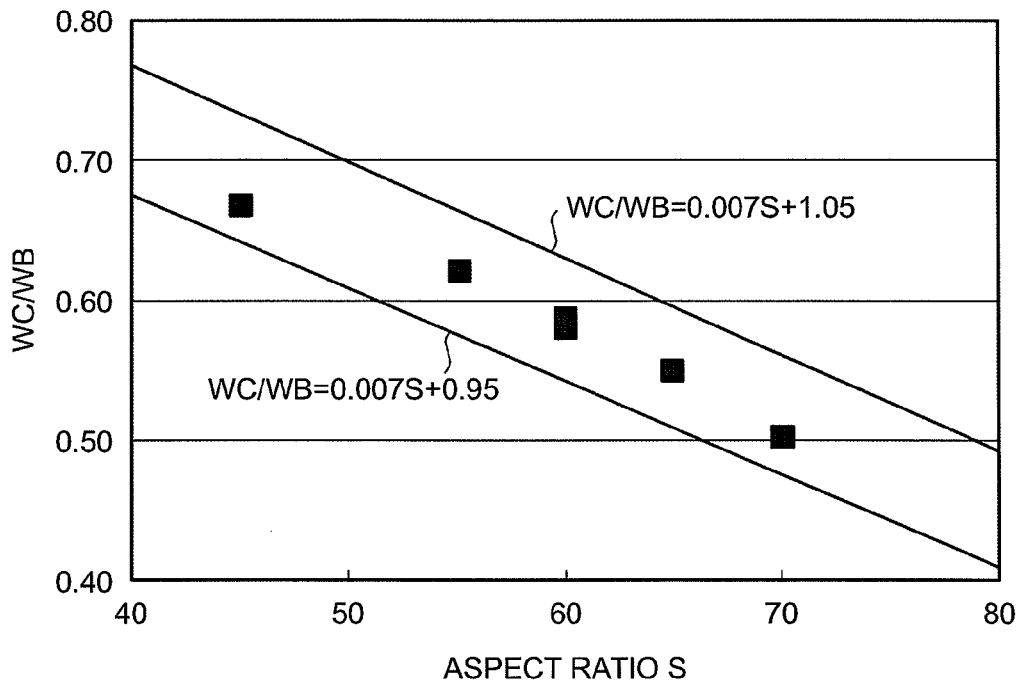
FIG. 3 is a graph of differences in the pneumatic tire shown in FIG. 1 depending on each tire profile.
Figure 4:
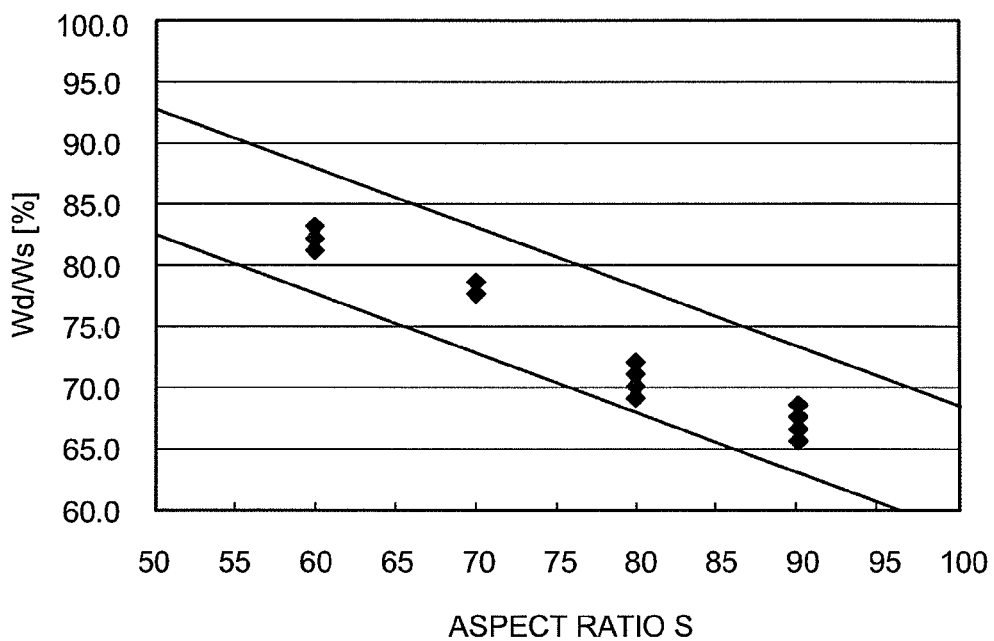
FIG. 4 is a graph of differences in the pneumatic tire shown in FIG. 1 depending on each tire profile.

FIG. 1 is a cross section of a pneumatic tire in a tire meridian direction according to a first embodiment of the present invention. FIG. 2 is a schematic diagram for explaining a movement of the pneumatic tire shown in FIG. 1. FIGS. 3 and 4 are graphs of differences in the pneumatic tire shown in FIG. 1 depending on each tire profile. FIGS. 5 and 6 are tables of results of performance tests on pneumatic tires according to the first embodiment of the present invention.

[Pneumatic Tire]

A pneumatic tire 1 includes a bead core 2, a carcass layer 3, a belt layer 4, a tread rubber 5, and a sidewall rubber 6 (see FIG. 1). The bead cores 2, each of which has an annular structure, on the left and right are constituted in a pair. The carcass layer 3 stretches across the bead cores 2 on the left and right in a toroidal shape, constituting a framework of the tire. The belt layer 4 has a plurality of belt members superposed and is arranged to a circumference of the carcass layer 3 in a tire radial direction. The tread rubber 5 is arranged to the circumference of the carcass layer 3 and the belt layer 4 in the tire radial direction, constituting a tread portion of the pneumatic tire 1. The sidewall rubber 6 is arranged on an outer side of the carcass layer 3 in a tire width direction, constituting a sidewall portion of the pneumatic tire 1. A plurality of main grooves 51 and 52 that extend in a tire circumferential direction is formed on the tread portion of the pneumatic tire 1. The main groove 52 on the outer side in the tire width direction is arranged in a position within a range of 15[%] to 30[%] of a tread width with a regular internal pressure from the outer side in the tire width direction.

Dimensions of the pneumatic tire 1 are defined as follows (see FIG. 1). The tire is held alone such that a tire base width is equal to or more than 100[%] and equal to or less than 120[%] of a rim width of a rim. In a cross section of the pneumatic tire 1 in the tire meridian direction, a virtual line of an applied rim (a rim flange portion of a wheel) 10 is drawn and a straight line drawn from a position of a rim height FH (an outermost point A of the rim flange portion in its radial direction) in the tire width direction is set as an X-axis. In addition, a straight line drawn in the tire radial direction via a center crown CL of the tire is set as a Y-axis (tire center axis).

A width WA of a half of the tire base width, a distance WB from the Y-axis to a maximum width position P, and a distance WC from the Y-axis to an inflection point Q of the carcass layer 3 are set. In addition, a distance HA from the X-axis to a peak R of the carcass layer 3 on the center crown CL, a distance HB from the X-axis to the maximum width position P of the carcass layer 3, and a distance HC from the X-axis to the inflection point Q are set. The dimensions WA, WB, WC, HA, HB, and HC have relationships of $48[\%] \leq HB/HA \leq 52[\%]$, $98[\%] \leq HC/HA \leq 100[\%]$, $108[\%] \leq WB/WA \leq 115[\%]$, and $55[\%] \leq WC/WA \leq 75[\%]$.

The shape of the tire as it is means the shape of the tire before being mounted on the applied rim 10. The shape of the tire as it is approximately the same as that of the tire in a curing mold (the shape of the tire just before being taken out of the curing mold). Usually, design dimensions of a tire are defined based on a shape of the tire in a mold. In other words, the shape of the tire in the curing mold is substantially the same as that of the tire before being mounted on the applied rim 10.

The rim refers to "rim" defined by the JATMA, "design rim" defined by the TRA, or "measuring rim" defined by the ETRTO. The rim height FH is defined by a height of the rim flange portion based on a rim diameter $\Phi$ of the wheel.

The inflection point Q of the carcass layer 3 is defined by a position where the carcass layer 3 curves toward an inner side in the tire radial direction based on a change in a curvature radius of the carcass layer 3 from the center crown CL to the outer side in the tire width direction in a cross section of the pneumatic tire 1 in the tire meridian direction. Specifically, the inflection point Q of the carcass layer 3 is positioned to satisfy $1[\%] \leq RA/RB \leq 10[\%]$ where RA is curvature radius of the carcass layer 3 in a position on the outer side of the belt layer 4 in the tire width direction and RB is curvature radius of the carcass layer 3 in a position on the inner side of the position of RA in the tire width direction. Alternatively, the inflection point Q can be defined as a point where an arc that is similar to the carcass line in a center area of the tread portion deviates from the carcass line.

When the tire is inflated, usually, the groove widths of the main grooves 51 and 52 increase because of a restrain by the rim width and application of internal pressure compared to that of the tire as it is. Thus, it can be thought that a strain that occurs in the groove bottom increases while the tire is rotated and a groove cracking occurs.

In this respect, because the shape (carcass line) of the carcass layer 3 is optimized in the pneumatic tire 1, a change of the shapes of the main grooves 51 and 52 (particularly, the main groove 52 on the outer side in the tire width direction) is reduced between a state of the pneumatic tire as it is and a state in which the tire is inflated (see FIG. 2). Therefore, a strain that occurs in the groove bottoms of the main grooves 51 and 52 is reduced, thereby advantageously preventing a groove cracking.

For example, a rim-cushion cracking (a cracking that occurs in the bead portion) may occur easily when $HB/HA < 48[\%]$ is satisfied, and groove cracking resistance may be degraded when $52[\%] < HB/HA$ is satisfied. Moreover, a volume of shoulder portions increases so that durability of the tire may be degraded when $HC/HA < 98[\%]$ is satisfied, and the groove cracking resistance may be degraded when $100[\%] < HC/HA$ is satisfied. Moreover, the groove cracking resistance may be degraded when $WB/WA < 108[\%]$ is satisfied, and the rim-cushion cracking may be easily caused when $115[\%] < WB/WA$ is satisfied. Moreover, the groove cracking resistance may be degraded when $WC/WA < 55[\%]$ or $75[\%] < WC/WA$ is satisfied.

[Additional Note 1]

In the pneumatic tire 1, it is preferable that the width WA, the distance WB, the distance WC, the distance HA, the distance HB, and the distance HC have relationships of $48[\%] \leq HB/HA \leq 52[\%]$, $98[\%] \leq HC/HA \leq 100[\%]$, $108[\%] \leq WB/WA \leq 115[\%]$, and $55[\%] \leq WC/WA \leq 75[\%]$ also in a state in which the pneumatic tire 1 is mounted on the applied rim 10 with an air pressure of 10% of the regular internal pressure. With this configuration, because the shape of the carcass layer 3 is further optimized, variations in the shapes of the main grooves 51 and 52 during the inflation are reduced. Therefore, a strain that occurs in the groove bottoms of the main grooves 51 and 52 is reduced, thereby advantageously preventing a groove cracking more effectively.

The regular internal pressure is "the maximum air pressure" defined by the JATMA, the maximum value of "tire load limits at various cold inflation pressures" defined by the TRA, or "inflation pressures" defined by the ETRTO.

[Additional Note 2]

In the pneumatic tire 1, it is also preferable that WC/WB and the profile S of the tire have a relationship of $-0.007 \times S + 0.95 \leq WC/WB \leq -0.007 \times S + 1.05$ (see FIG. 3). With this configuration, because the relationship between WC/WB and the profile S of the tire is optimized, the groove cracking resistance and the durability of the tire advantageously improve (are maintained). For example, when $WC/WB < -0.007 \times S + 0.95$ is satisfied, the volume of the shoulder portions increases, so that the durability of the tire may be degraded. Furthermore, when $-0.007 \times S + 1.05 < WC/WB$ is satisfied, the groove cracking resistance may be degraded.

In the pneumatic tire 1, it is preferable that Wd that is a maximum belt width of the belt layer 4, Ws that is a tire total width, and the profile S of the tire have a relationship of $-0.5 \times S + 108 \leq Wd/Ws \leq -0.5 \times S + 118$ in a sate in which the tire is mounted on the rim with the regular internal pressure (see FIG. 4). With this configuration, because the relationship between the maximum belt width Wd, the tire total width Ws, and the profile S is optimized, the groove cracking resistance of the tire advantageously improves (is maintained). For example, when $Wd/Ws < -0.5 \times S + 108$ is satisfied, the groove cracking resistance may be degraded. Moreover, when $-0.5 \times S + 118 < Wd/Ws$ is satisfied, the belt width is too wide, so that the weight of the tire may excessively increase.

The pneumatic tire 1 can be applied to a single tire (for example, a tire with tire total width Ws of 350 [nm] or more) as well as dual tires. In the single tire, it is preferable that the maximum belt width Wd of the belt layer 4, the tire total width Ws, and the profile S of the tire have a relationship of $-0.6 \times S + 108 \leq Wd/Ws \leq -0.6 \times S + 118$. With the relation, also in a wide base tire, the groove cracking resistance of the tire advantageously improves (is maintained).

It is preferable that the pneumatic tire 1 is applied to a heavy-duty tire with a profile (nominal profile) of 65 or less. In such a heavy-duty tire, a groove cracking occurs easily in the main groove 52 in a shoulder area of the tread portion. For this reason, by applying the pneumatic tire 1 to the heavy-duty tire, an effect concerning the groove cracking resistance of the tire is advantageously obtained remarkably.

[Performance Test]

In the first embodiment, a plurality of types of pneumatic tires under different conditions underwent performance tests for rim-cushion cracking resistance and groove cracking resistance (see FIGS. 5 and 6). In each performance test, (1) a pneumatic tire in a tire size of 285/60R22.5 and (2) a pneumatic tire in a tire size of 385/55R22.5 are used. Each of the tires is mounted on a rim defined by the JATMA and applied with the regular internal pressure and a regular load.

In the performance test for rim-cushion cracking resistance (circumferential direction cracking resistance of a surface of a bead portion), a drum test is performed on the pneumatic tire applied with a load of 140[%] of the regular load, in which the number and lengths of circumferential cracks that have occurred in the surface of the bead portion are measured after traveling for 20000 [km] at a traveling speed of 45 [km/h]. Index evaluation using a conventional example as a reference (100) is performed based on results of the measurement. In the evaluation, the smaller the index is, the more it is preferable.

In the performance test for groove cracking resistance, the drum test is performed while ozone is sprayed to the pneumatic tire, in which the number and lengths of cracks that have occurred are measured after traveling for 10000 [km] at the traveling speed of 45 [km/h]. Index evaluation using a conventional example as a reference (100) is performed based on results of the measurement. In the performance test, an index 150 or more is used as a reference to determine an effect of improvement in groove cracking resistance. In the evaluation, the smaller the index is, the more it is preferable.

The conventional pneumatic tire is a commercially available tire. Each of the pneumatic tires 1 of Examples 1 to 3 has optimized dimensions (width WA, distance WB, distance WC, distance HA, distance HB, and distance HC). As represented by the test results, the rim-cushion cracking resistance is maintained while the groove cracking resistance improves in the pneumatic tires 1 of Examples 1 to 3.

Second Embodiment

Figure 7:
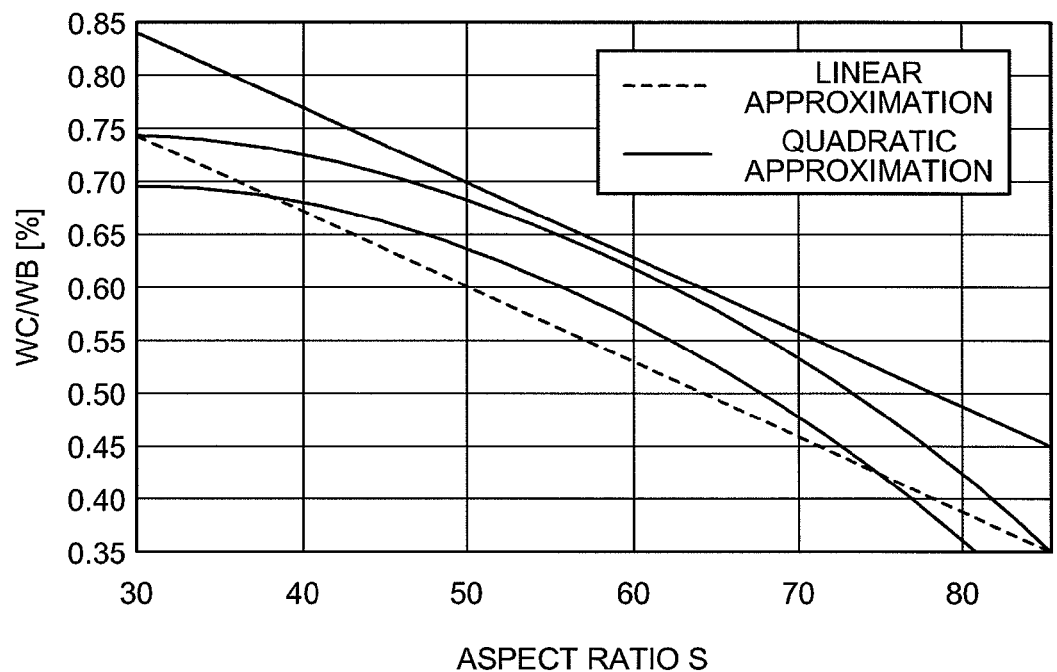
FIG. 7 is a graph of differences in a pneumatic tire according to a second embodiment of the present invention depending on each tire profile.
Figure 8:
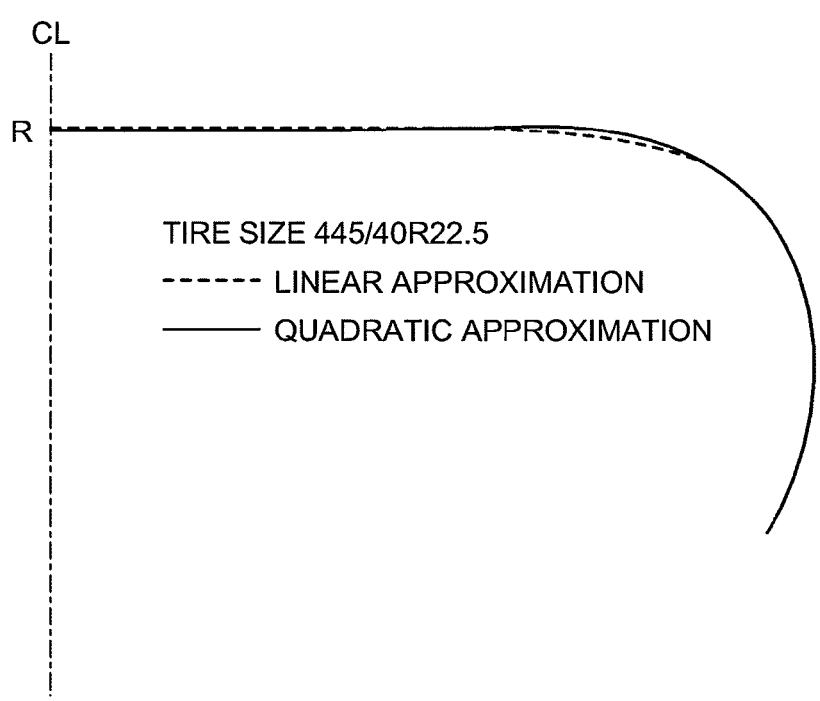
FIG. 8 is a schematic diagram for explaining a carcass line of the pneumatic tire according to the second embodiment of the present invention.

FIG. 7 is a graph of differences in a pneumatic tire according to a second embodiment of the present invention depending on each tire profile. FIG. 8 is a schematic diagram for explaining a carcass line of the pneumatic tire according to the second embodiment of the present invention. FIG. 9 is a table for explaining characteristics of the pneumatic tire according to the second embodiment of the present invention. FIGS. 10 and 11 are tables of results of performance tests on the pneumatic tire according to the second embodiment of the present invention.

The pneumatic tire 1 according to the second embodiment is different from the pneumatic tire 1 according to the first embodiment in that predetermined dimensional ratios USH/HA, WB/HA, and WC/WB of a cross sectional shape of the carcass layer 3 (carcass line) in a cross section of the pneumatic tire 1 in the tire meridian direction are defined by predetermined quadratic approximation.

Specifically, a distance USH from the maximum width position P of the carcass layer 3 to the inflection point Q of the carcass layer 3 in a Y-axis direction and the distance HA from the X-axis to the peak R of the carcass layer 3 on the center crown CL have a relationship of $0.48 \leq USH/HA \leq 0.52$. In addition, a nominal profile S of the tire, the distance WB from the Y-axis to the maximum width position P of the carcass layer 3, and the distance HA have a relationship of $5.52S^2 \times 10^{-5} - 2.407S \times 10^{-2} + 2.29 \leq WB/HA \leq 5.52S^2 \times 10^{-5} - 2.407S \times 10^{-2} + 2.39$. The nominal profile S, the distance WC from the Y-axis to the inflection point Q of the carcass layer, and the distance WB have a relationship of $-1.1312S^2 \times 10^{-4} + 5.822S \times 10^{-3} + 0.62 \leq WC/WB \leq -1.1312S^2 \times 10^{-4} + 5.822S \times 10^{-3} + 0.68$.

In the second embodiment, the tire dimensions are defined based on the cross section of the tire held in the curing mold in the tire meridian direction. Alternatively, the tire dimensions can be defined based on the cross section of the tire as it is in the tire meridian direction.

In the pneumatic tire, because the cross sectional shape of the carcass layer 3 (carcass line) is optimized, a change of the shapes of the main grooves 51 and 52 is reduced between a state of the tire as it is and a state in which the tire is inflated (see FIG. 2). Therefore, when the tire is mounted on a rim and applied with an air pressure, the groove bottoms of the main grooves 51 and 52 are not widened easily. This reduces a strain that occurs in the groove bottoms of the main grooves 51 and 52, thereby advantageously preventing a groove cracking from occurring.

Furthermore, because WB/HA and WC/WB are defined by the predetermined quadratic approximation, the cross sectional shape of the carcass layer 3 is optimized with high accuracy compared to a structure in which WB/HA and WC/WB are defined by linear approximation (see FIG. 8). Specifically, the position of the carcass line near the groove bottom of the main groove 52, which is obtained by quadratic approximation, is higher than that obtained by linear approximation (a position in the tire radial direction). As a result, the change of the shapes of the main grooves 51 and 52 is effectively reduced between a state of the tire as it is and a state in which the tire is inflated, thereby reducing a strain that occurs in the groove bottoms of the main grooves 51 and 52. This improves the groove cracking resistance of the tire.

Usually, the ratios USH/HA, WB/HA, and WC/WB, the groove cracking resistance of the tire, and durability of the belt layer 4 have the following relationships (see FIG. 9). When the ratio USH/HA increases, there is a tendency that the groove cracking resistance improves and the durability of the belt layer 4 degrades. On the other hand, when the ratio USH/HA decreases, there is a tendency that the groove cracking resistance degrades and the durability of the belt layer 4 improves. When the ratio WB/HA increases, there is a tendency that the groove cracking resistance degrades and the durability of the belt layer 4 improves. On the other hand, when the ratio WB/HA decreases, there is a tendency that the groove cracking resistance improves and the durability of the belt layer 4 degrades. When the ratio WC/WB increases, there is a tendency that the groove cracking resistance degrades and the durability of the belt layer 4 improves. On the other hand, when the ratio WC/WB decreases, there is a tendency that the groove cracking resistance improves and the durability of the belt layer 4 degrades.

In the pneumatic tire 1, it is preferable that the width WA of a half of the tire base width and a nominal tire cross sectional width M have a relationship of $0.44 \leq WA/M \leq 0.46$. This configuration is advantageous in that air inflation performance of the tire, durability of a bead portion, and manufacturing failure resistance advantageously improve because the ratio WA/M of the tire base width (half width WA) to the nominal tire cross sectional width M is optimized (see FIG. 11). A theoretical rim width is WA/M=0.75, and the ratio WA/M close to 0.75 is used as a use rim width. Therefore, in the configuration in which WA/M is set within the above range ($0.44 \leq WA/M \leq 0.46$), the tire base width is wide.

Furthermore, in the pneumatic tire 1, it is preferable that the curvature radius RA of the carcass layer 3 in the position on the outer side of the belt layer 4 in the tire width direction and the distance USH from the maximum width position P of the carcass layer 3 to the inflection point Q of the carcass layer 3 in the Y-axis direction have a relationship of $0.95 \leq RA/USH \leq 1.05$ (see FIG. 1). With this configuration, because the curvature radius RA of the carcass line from the shoulder portion to the sidewall portion is optimized, a strain that occurs in the groove bottoms of the main grooves 51 and 52 is effectively reduced, thereby advantageously preventing a groove cracking from occurring. For example, when R/USH<0.95 is satisfied, the carcass line easily deviates toward its outer side in the tire width direction in tire inflated compared to that in the tire as it is, which is not preferable. On the other hand, when 1.05<R/USH is satisfied, the tire shape is not optimized, which easily leads to drawbacks such as an increase in tire weight or a degradation in tire durability.

Moreover, when the pneumatic tire 1 is mounted on the rim and applied with the air pressure of 5[%] of the regular internal pressure, it is preferable that the nominal profile S of the tire and the distances USH, HA, WB, and WC have relationships of $4.157S^2 \times 10^{-5} - 6.738S \times 10^{-3} + 0.56 \leq USH/HA \leq 4.157S^2 \times 10^{-5} - 6.738S \times 10^{-3} + 0.63$ and $1.7874S^2 \times 10^{-4} - 2.7522S \times 10^{-2} + 1.60 \leq WC/WB \leq 1.7874S^2 \times 10^{-4} - 2.7522S \times 10^{-2} + 1.66$.

With this configuration, the shape of the carcass layer is further optimized, variations in the shapes of the main grooves during inflation reduce. This reduces a strain that occurs in the groove bottoms of the main grooves, thereby advantageously preventing the groove cracking more effectively.

For example, in a tire with the nominal profile S of S=60, $0.305 \leq USH/HA \leq 0.375$ and $0.592 \leq WC/WB \leq 0.652$ are satisfied. Furthermore, a tire profile of a tire in a tire size of 265/60R22.5, USH/HA=0.29 and WC/WB=0.67 are satisfied.

[Application Target]

It is preferable that the pneumatic tire 1 is applied to a tire with the nominal profile S within a range of $S \leq 70$, and particularly, to a heavy-duty pneumatic radial tire. In such tires, particularly, occurrence of a groove cracking is remarkable. Therefore, by applying the pneumatic tire 1 to those tires, more remarkable effects concerning groove cracking resistance can be advantageously obtained.

[Performance Test]

In the second embodiment, a plurality of types of pneumatic tires under different conditions underwent performance tests for (1) groove cracking resistance, (2) durability of belt layer, (3) air inflation performance, and (4) durability of bead portion (see FIGS. 10 and 11).

In the performance tests for (1) groove cracking resistance and (2) durability of belt layer, analysis on density of energy of a strain in groove bottoms of main grooves and a strain in an end portion of the belt layer when a tire is filled with an internal pressure is performed by simulation analysis using the finite element method, and index evaluation is performed on each pneumatic tire. Specifically, test conditions in which a pneumatic tire in a tire size of 315/60R22.5 is mounted on a rim in a rim size of 22.5×9.00 and applied with an air pressure of 900 [kPa] are adopted. When an index of groove cracking resistance is equal to 130 or more and an index of durability of belt is equal to 85 or more, the effect is obtained.

In the performance tests for (3) air inflation performance and (4) durability of bead portion, a pneumatic tire in the tire size of 315/60R22.5 is mounted on a rim in a rim size of 22.5×9.00 and applied with the air pressure of 900 [kPa]. In this state, the air inflation performance is evaluated. In addition, a vehicle with the tire is traveled, and a travel distance at a time when the bead portion is damaged is measured to perform index evaluation concerning durability of the bead portion.

A pneumatic tire of Conventional example is one that is widely known. Each of pneumatic tires of Examples 4 to 18 has the optimized ratio USH/HA, the optimized ratios WB/HA and WC/WB to the nominal profile S of the tire, and the optimized ratio RA/USH.

As represented by the test results, the durability of belt layer is maintained and the groove cracking resistance improves in each of the pneumatic tires 1 of Examples 4 to 13 (see FIG. 10). Furthermore, the durability of belt layer is maintained and the groove cracking resistance further improves with the optimized ratio USH/HA, the optimized ratios WB/HA and WC/WB to the nominal profile S of the tire, and the optimized ratio WC/WB.

Moreover, as represented by the test results shown in FIG. 11, the ratio RA/USH, the air inflation performance, and the durability of bead portion are relative to each other. Therefore, with the optimized ratio RA/USH, a desired tire performance can be achieved.

INDUSTRIAL APPLICABILITY

As explained above, the pneumatic tire of the present invention is effective with a capability of preventing a groove cracking.

The invention claimed is:

1. A pneumatic tire having a tire profile equal to or less than 65, the pneumatic tire comprising:
   a pair of bead cores;
   a carcass layer that bridges between the bead cores in a toroidal shape; and
   a belt layer that is arranged on an outer side of the carcass layer in a tire radial direction, wherein in a cross section of the pneumatic tire in a tire meridian direction when the pneumatic tire is held without an external pressure to have a tire base width equal to or more than 100[%] and equal to or less than 120[%] of a width of an applied rim, the following relationships:

$48[\%] \leq HB/HA \leq 52[\%]$, $98[\%] \leq HC/HA \leq 100[\%]$, $108[\%] \leq WB/WA \leq 115[\%]$, and $55[\%] \leq WC/WA \leq 75[\%]$ are satisfied, where, when a straight line that is drawn from a position A of rim height FH in a tire width direction is an X-axis and a straight line that is drawn in the tire radial direction via a center crown CL is a Y-axis, WA is a distance of half of the tire base width, WB is distance from the Y-axis to a maximum width position P of the carcass layer, WC is a distance from the Y-axis to an inflection point Q of the carcass layer, HA is a distance from the X-axis to a peak R of the carcass layer on the center crown CL, HB is a distance from the X-axis to the maximum width position P of the carcass layer, and HC is a distance from the X-axis to the inflection point Q of the carcass layer.

2. The pneumatic tire according to claim 1, wherein, in a state in which the pneumatic tire is mounted on the applied rim and air pressure of 10% of regular internal pressure is applied to the tire, the width WA, the distance WB, the distance WC, the distance HA, the distance HB, and the distance HC satisfy the following:

$48[\%] \leq HB/HA \leq 52[\%]$, $98[\%] \leq HC/HA \leq 100[\%]$, $108[\%] \leq WB/WA \leq 115[\%]$, and $55[\%] \leq WC/WA \leq 75[\%]$.

3. The pneumatic tire according to claim 1, wherein WC/WB and a tire profile S of the pneumatic tire satisfy:

$-0.007 \times S + 0.95 \leq WC/WB \leq -0.007 \times S + 1.05$.

4. The pneumatic tire according to claim 1, wherein in a state in which the pneumatic tire is mounted on the applied rim and regular internal pressure is applied to the tire, a maximum belt width Wd of the belt layer, a total width Ws of the pneumatic tire, and a tire profile S of the pneumatic tire satisfy:

$-0.5 \times S + 108 \leq Wd/Ws \leq -0.5 \times S + 118$.

5. A pneumatic tire having a tire profile equal to or less than 65, the pneumatic tire comprising:
   a pair of bead cores;
   a carcass layer that bridges between the bead cores in a toroidal shape; and
   a belt layer that is arranged on an outer side of the carcass layer in tire radial direction, wherein
   in a cross section of the pneumatic tire in a tire meridian direction when the pneumatic tire is held in a curable mold, the following relationships:

$48[\%] \leq HB/HA \leq 52[\%]$, $98[\%] \leq HC/HA \leq 100[\%]$, $108[\%] \leq WB/WA \leq 115[\%]$, and $55[\%] \leq WC/WA \leq 75[\%]$ are satisfied, where, when a straight line that is drawn from a position A of rim height FH in a tire width direction is an X-axis and a straight line that is drawn in the tire radial direction via a center crown CL is a Y-axis, WA is a distance of half of a tire base width, WB is a distance from the Y-axis to a maximum width position P of the carcass layer, WC is a distance from the Y-axis to an inflection point Q of the carcass layer, HA is a distance from the X-axis to a peak R of the carcass layer on the center crown CL, HB is a distance from the X-axis to the maximum width position P of the carcass layer, and HC is a distance from the X-axis to the inflection point Q of the carcass layer.

6. The pneumatic tire according to claim 5, wherein, in a state in which the pneumatic tire is mounted on the applied rim and air pressure of 10% of regular internal pressure is applied to the tire, the width WA, the distance WB, the distance WC, the distance HA, the distance HB, and the distance HC satisfy the following:

$48[\%] \leq HB/HA \leq 52[\%]$, $98[\%] \leq HC/HA \leq 100[\%]$, $108[\%] \leq WB/WA \leq 115[\%]$, and $55[\%] \leq WC/WA \leq 75[\%]$.

7. The pneumatic tire according to claim 5, wherein WC/WB and a tire profile S of the pneumatic tire satisfy:

$-0.007 \times S + 0.95 \leq WC/WB \leq -0.007 \times S + 1.05$.

8. The pneumatic tire according to claim 5, wherein in a state in which the pneumatic tire is mounted on the applied rim and regular internal pressure is applied to the tire, a maximum belt width Wd of the belt layer, a total width Ws of the pneumatic tire, and a tire profile S of the pneumatic tire satisfy:

$-0.5 \times S + 108 \leq Wd/Ws \leq -0.5 \times S + 118$.

* * * * *